United States Patent [19]

Perry et al.

[11] 4,411,310

[45] Oct. 25, 1983

[54] HEAT EXCHANGE APPARATUS HAVING THIN FILM FLEXIBLE SHEETS

[75] Inventors: Clifford R. Perry, Renton; Lloyd H. Dietz, Seattle; Roger L. Shannon, Federal Way, all of Wash.

[73] Assignee: The Boeing Company, Seattle, Wash.

[21] Appl. No.: 200,510

[22] Filed: Oct. 24, 1980

Related U.S. Application Data

[63] Continuation of Ser. No. 894,255, Apr. 7, 1978, abandoned.

[51] Int. Cl.³ .............................................. F28F 3/00
[52] U.S. Cl. ................................................. 165/166
[58] Field of Search ............. 159/13 B; 165/115–118, 165/157, 165–166, 170–173, DIG. 8

[56] References Cited

U.S. PATENT DOCUMENTS

| | | | |
|---|---|---|---|
| 1,409,520 | 3/1922 | Bird | 165/166 X |
| 3,086,624 | 4/1963 | Wyatt | 165/166 |
| 3,371,709 | 3/1968 | Rosenblad | 159/13 B |
| 3,435,893 | 4/1969 | Withers | 165/DIG. 8 |
| 3,808,104 | 4/1974 | Davidson | 165/166 |

Foreign Patent Documents

2289870  7/1976  France ........................ 165/DIG. 8

*Attorney, Agent, or Firm*—Hughes, Barnard & Cassidy
*Primary Examiner*—Sheldon J. Richter

[57] ABSTRACT

A heat exchange apparatus made up of a plurality of sheets, desirably made of thin film plastic, bonded one to another to form a unitized heat exchange structure. Alternate first pairs of sheets are bonded one to another along a first set of longitudinally extending bond lines positioned at first transverse locations along width dimensions of the sheets. There is a second set of pairs of alternately spaced sheets (made up of adjacent sheets of adjoining first pairs of sheets) which are bonded one to another along a second set of longitudinally extending bond lines positioned transversely intermittent of the first set of longitudinal bond lines. These sheets are expanded from one another to form a plurality of diamond-shaped heat exchange passageways arranged in parallel rows. In the preferred form, each end of the heat exchange structure is bonded into a molded base member, which in turn is connected to a related manifold structure. Each manifold structure has a pair of oppositely positioned manifold chambers leading to parallel alternately spaced feed passages, with each alternate set connecting to a related alternate set of heat exchange passageways.

16 Claims, 20 Drawing Figures

HEAT EXCHANGE APPARATUS HAVING THIN FILM FLEXIBLE SHEETS

This is a continuation application of U.S. Application Ser. No. 894,255, filed Apr. 7, 1978, now abandoned.

BACKGROUND OF THE INVENTION

A. Field of the Invention

The present invention relates to heat exchange apparatus, methods of making said heat exchange apparatus, methods of accomplishing counterflow heat exchange, coflow heat exchange, and heat exchange by evaporation and condensation by use of such apparatus, said heat exchange apparatus and methods being particularly adapted for large scale operations, such as those used in converting saline or brackish water to pure water, but capable of being used on any application requiring a heat exchanger with operating conditions within the pressure and temperature capability of the materials of herein described heat exchanger.

B. Brief Description of the Prior Art

Since the present invention is well adapted for use in conjunction with heat exchange systems where saline or brackish water is converted to potable water, the general state of the prior art with regard to heat exchangers will be given consideration with reference to such systems. A common arrangement for such systems is to employ two distinct heat exchangers. The first heat exchanger is generally a counterflow heat exchanger and is used to place the brine which is initially flowing into the system in heat exchange relationship with the potable water flowing from the system to transfer the heat from the potable water to the incoming brine and raise its temperature from ambient temperature to a higher temperature, possibly in the order of 200° F. or so. The second heat exchanger is a condenser/evaporator type heat exchanger where the brine is pumped to the upper end of the heat exchanger and caused to fall as a thin film over one side of a set of heat exchange surfaces. At the same time, steam which is derived by heating the brine is compressed to a higher pressure and exposed to the opposite side of the heat exchange surfaces to be in heat exchange relationship with the brine film. This causes potable water to condense on the second set of surfaces and also causes evaporation of water from the brine flowing downwardly on the opposite sides. This condensed water is collected and passed out through the first counterflow heat exchanger to raise the temperature of the incoming brine as described above.

In general, there have been two common arrangements for the elements which provide the heat exchange surfaces. One is to provide a plurality of plates arranged parallel to one another and spaced a short distance from each other, so that a plurality of adjacent passageways are formed by the various sets of plates this is commonly called a flat plate heat exchanger. One heat exchange medium is directed through a first set of alternately spaced passages, while the second heat exchange medium is directed through the second set of passageways spaced intermittently with the first set. Thus, heat is transferred from one heat exchange medium to the other through the plates.

The second general arrangement for heat exchangers is to provide the heat exchange elements in the form of elongate tubes which extend through a heat exchange chamber and are spaced a moderate distance from one another. One heat exchange medium is directed into the interior of the tubes, while the other heat exchange medium is directed into the area between and around the outside of the tubes. In some instances, the second heat exchange medium flows in a direction transverse to the longitudinal axes of the tubes, and in other arrangements, the second heat exchange medium is directed parallel to the longitudinal axes of the tubes.

Since one of the main factors influencing the effectiveness of the heat exchanger is the heat transfer characteristics of the material separating the two heat exchange mediums, it has been quite common to fabricate the heat exchange elements from a metal which has a high thermal conductivity. However, for massive heat exchange installations, such as those used in producing potable water from saline water, the cost of providing and maintaining heat exchange elements in a quantity and size necessary to provide the heat exchange surface required, is a significant factor in determining whether the overall heat exchange system is economically feasible. This becomes particularly critical where metal is used as the material for the heat exchange elements, since the fabriction and installation of a vast number of metallic heat exchange elements can become a substantial portion of the cost of the entire system.

Accordingly, there have been attempts in the prior art to fabricate the heat exchange elements from other materials, and one of the results is research and development work in thin plastic film heat exchangers. Since plastic, in comparison to metal used in heat exchangers, is a relatively poor conductor of heat, for such films to operate with reasonable effectiveness, it is necessary to make the films quite thin to obtain adequate transfer of heat. The result is that the film material is generally relatively flexible and fragile in comparison to comparable metal heat exchange structures. When the thin film plastic is arranged as planar sheets to form the heat exchange surfaces (in the general configuration of metal panels), it becomes difficult to maintain the sheets in proper spaced relationship with respect to one another. One of the reasons for this is that to operate the heat exchanger, either as a counterflow heat exchanger or an evaporative type heat exchanger it is generally necessary to have at least some pressure differential between the two heat exchange mediums.

It has also been attempted in the prior art to provide thin film plastic heat exchangers in the form of tubular heat exchange elements. This alleviates to some extent the problem posed by pressure differential between the heat exchange mediums, since the higher pressure heat exchange medium can be directed into the interior of the tubes which are then caused to assume a generally circular configuration in response to the internal pressure. However, for practical commercial operation, these tubes must be provided in relatively long lengths, and there are quite often problems of instability in the tubes oscillating or becoming positioned against one another in response to the influence of the flow of the heat exchange medium or mediums either through or around the tubes. Not only does this create problems in preserving the structural integrity of the heat exchange structure, but it also creates a problem in the optimization of the heat transfer characteristics of the heat exchanger.

With regard to the various heat exchange devices shown in the literature of United States patents, the following are noted:

U.S. Pat. No. 1,955,261, Tryon et al., shows a heat exchanger where there are a plurality of tubes which are arranged in an alternating pattern and cast into a block made of a suitable metal, such as aluminum or copper.

U.S. Pat. No. 2,347,957, McCullough, shows a heat exchanger comprising a tubular member arranged in a circuitous pattern and having a number of fins extending therefrom to improve heat transfer.

U.S. Pat. No. 3,161,574, Elam, shows a condensor type heat transfer device where thin film plastic tubes are used as the heat exchange elements. Pressurized steam is directed into the interior of the tubes, and brine is directed as a film over the outside surface of the tubes.

U.S. Pat. No. 3,315,740, Withers, shows a heat exchanger made up of a tube handle. The ends of the tubes are gathered together in a manner to form a fluid tight end portion of the tubular heat exchanger.

U.S. Pat. No. 3,493,040, Davison, shows a plate-type heat exchanger where the plates are formed with dimples to provide for proper spacing of the plates.

U.S. Pat. No. 3,537,935, Withers, shows a heat exchanger formed with plastic tubes, with one heat exchange medium being directed through the tubes and the other heat exchange medium being directed along a path transverse to the lengthwise axis of the tubes, commonly called a crossflow heat exchanger.

U.S. Pat. No. 3,616,835, Laurenty, is generally representative of a flat plate type heat exchanger.

U.S. Pat. No. 3,790,654, Bagley, teaches a method of extruding thin-walled honeycombed structure. While the teaching of this patent is not directed specifically toward heat exchangers, it does state that such honeycomb structures are used in regenerators, recuperators, radiators, catalyst carriers, filters, heat exchangers and the like.

U.S. Pat. No. 3,825,460, Yoshikawa et al, shows a carbonaceous honeycomb structure where tubular-like elements are formed into a variety of structures having elongate passageways, some of which are triangular, some of which are circular, and some of which are hexagonal.

U.S. Pat. No. 3,926,251, Pei, shows a counterflow heat exchanger where circular tubes are laid down, then expanded into contact with one another. In one embodiment, the tubes are arranged in a pattern so that the end passageways are formed as squares. In another configuration the tubes are arranged so that the end configuration of the passageways are hexagonal.

U.S. Pat. No. 3,948,317, Moore, discloses glass-ceramic tubes which are formed into a honeycomb configuration for use as heat exchangers.

U.S. Pat. No. 3,983,283, Bagley, discloses a ceramic honeycomb structure for use as a catalytic convertor or heat exchanger.

U.S. Pat. No. 4,002,040, Munters, shows a cross-current heat exchanger, where an airstream is cooled by evaporating moisture into a second air stream placed in heat exchange relationship with the first air stream.

U.S. Pat. No. 4,029,146, shows several configurations of a corrugated metal panel used as a heat exchanger.

The following patents are noted as broadly representative of various prior art devices: U.S. Pat. No. 2,820,744, Lighter; U.S. Pat. No. 3,168,450, Black; U.S. Pat. No. 3,239,000, Meagher; U.S. Pat. No. 3,367,843, Clive et al; U.S. Pat. No. 3,396,785, Kirsch; U.S. Pat. No. 3,428,529, Gumucio; U.S. Pat. No. 3,672,959, Sweet; U.S. Pat. No. 3,703,443, Evans; and U.S. Pat. No. 3,929,951, Shibata et al.

SUMMARY OF THE INVENTION

In the method of making a heat exchange apparatus according to the present invention, there is first provided a plurality of flexible sheets, each of which has a lengthwise axis, a transverse axis, and a vertical axis which is perpendicular to the plane of the sheet. These sheets are placed adjacent one another in both longitudinal and transverse alignment, and in vertically stacked relationship.

These sheets are bonded one to another to form a unitized heat exchange structure. (In this description, the term "bonded" is used in its broader sense of securely connecting one member to another. The preferred form of accomplishing the bonding is by heat sealing.) The bonding is accomplished by bonding alternate first pairs of a first set of adjacent sheets one to another along a first set of longitudinally extending bond lines, which bond lines are positioned at predetermined transversely spaced first locations across the sheets. Intermediate second pairs of sheets are bonded one to another along a plurality of longitudinally extending second bond lines which are positioned at transversely spaced second locations across said second pairs of sheets. These second locations are positioned transversely intermediate the first locations of the first bond lines. Each of the intermediate second pairs of sheets is made up of adjacent sheets of adjacent first pairs of sheets. After the unitized heat exchange structure is formed by the above bonding steps, the sheets of the unitized structure are expanded along the vertical axis of the sheets one from another to cause such sheets to become arranged to define a plurality of adjacent generally diamond-shaped passageways which are arranged in parallel rows. A convenient manner of expanding the unitized structure is by injecting a fluid medium (e.g., compressed air) into the passageways of the unitized structure. The passageways are desirably maintained in their expanded configuration by inserting spacing elements in said passageways.

Each of the passageways which are positioned in an interior location in the unitized structure are defined by four diagonally oriented single-thickness sheet portions and two laterally oriented double-thickness bonded sheet portions. Thus, effective heat transfer is able to take place across the diagonally oriented single-thickness sheet portions.

The expanded unitized structure, with the diamond-shaped passageways properly formed, has the first and second ends thereof connected to, respectively, first and second base members. Each base member has a plurality of through openings connecting with the passageways. In the preferred form of forming the base members, a liquid base material is placed in a mold, and one end of the unitized structure is inserted into the liquid base material. Thereafter, the liquid base material is caused to harden (e.g., by curing) to form the base member to which the unitized structure is bonded. Desirably, the through openings in the base member are formed while the base material is still in the liquid state.

An end member is bonded to the other end of the unitized structure by inserting spacing elements in the passageways of the open end of the unitized structure and providing a second batch of liquid base material in a mold. The other end of the unitized structure is then inserted into the liquid base material, which is then caused to harden. The spacing elements are removed from the passageways of the unitized structure by heating the end of the unitized structure to cause the spacing elements to be heated above their melting point (which is desirably about 150° F.), after which the liquid material flows out of the openings which are formed in the base member.

Two manifold members are connected one to each base member. Each manifold structure is formed with two oppositely positioned manifold chambers, and also with two sets of alternately positioned parallel feed passages, one set of feed passages extending from the first manifold chamber, and a second set of feed passages (positioned intermittently of the first set of passages) extending from the second manifold chamber. The feed passages are aligned with parallel rows of passageways of the unitized heat exchange structure, so that one manifold chamber through its related feed passages communicates with one set of alternate passageways of the unitized structure, and the second manifold chamber communicates through its related feed passages with a second set of alternately spaced passageways of the unitized heat exchange structure.

A convenient manner of joining each heat exchange structure with its related base member, is to provide one with a plurality of protruding nipple elements, each having a through opening therein, and the other with a set of matching recesses to receive the nipple elements. This assures proper joinder of each heat exchange structure with its related base member, and also proper alignment of the manifold feed passages and through openings leading to the passageways of the unitized heat exchange structure.

One preferred method of bonding the sheets one to another is to first bond first and second sheets one to another along a first set of longitudinally extending bond lines, and then placing a third sheet adjacent the second sheet. The third sheet is then bonded to the second sheet along a second group of longitudinally extending bond lines located at second locations spaced transversely intermittently with respect to the first group of bond lines. Thereafter a fourth sheet is placed adjacent the third sheet, and bonded thereto along a third group of longitudinally extending bond lines vertically aligned with the first group of bond lines of the first and second sheets. Subsequently, a fifth sheet is placed adjacent the fourth sheet, and is bonded to the fourth sheet along a fourth group of longitudinally extending bond lines positioned in vertical alignment with the group of bond lines between the second and third sheets. Subsequent sheets are added to the first five sheets and bonded thereto in a pattern repeating the bonding accomplished between the first five sheets.

The bonding is desirably accomplished by applying both heat and pressure against the sheets at the locations of the bond lines. To prevent unwanted bonding between pairs of sheets, separating strips are provided at the appropriate locations between such pairs of sheets where a bond is not desired. For example, in the above-described process separating strips would be provided between the first and second sheets at the location of the second group of longitudinally extending bond lines at which the second and third sheets are bonded one to another.

To accomplish this bonding operation in a continuous manner, the first and second sheets are directed into a first bonding area at which bonding pressure is applied in a continuous manner along the length of the bond lines of the first and second sheets. One convenient method of accomplishing this bond is applying pressure elements having endless contact means, such as an endless contact belt which has a contact portion travelling continuously at the same rate of speed as the feed rate of the first and second sheets into the first bonding area. Simultaneously with the feeding of the first and second sheets into the first bond area, separating strips are directed continuously along longitudinal paths between the first and second sheets, with each separating strip being positioned between adjacent bond lines.

From the first bonding area, where the first and second sheets are bonded one to another, these first and second sheets are directed into a second bonding area along with a third sheet and a second set of separating strips. The second set of separating strips are positioned above the location of the bond lines between the first and second sheets. At the second bonding area, bonding is accomplished between the second and third sheets by simultaneously applying heat and pressure along a group of second bond lines positioned transversely intermittently of the group of first bond lines between the first and second sheets.

Thereafter, the first, second and third sheets, being bonded one to another, are directed along with a fourth sheet and a third group of separating strips into a third bonding area, along with separating strips positioned between the third and fourth sheets. Bonding between the third and fourth sheets is accomplished in substantially the same manner as described above with the location of this third group of bond lines being vertically aligned with the bond lines between the first and second sheets.

In one form, each of the pressure elements has an endless belt which rides over two end rollers. Each has at its rear end a heating device and at its forward end a cooling device, both of which are positioned between the upper and lower runs of the belt. The two belts are placed one above the other so that adjacent surfaces of the belts are in contact with one another or at least closely adjacent one another. The heating device causes the adjacent plastic sheet portions located therebetween to soften, and the cooling device completes the heat seal.

The first, second, third and fourth sheets, being bonded one to another, are directed into a fourth bonding area along with a fifth sheet and a fourth set of separating strips, and bonding of the fifth sheet to the fourth sheet is done in the manner described above. The bond lines between the fourth and fifth sheet are vertically aligned with the bond lines between the second and third sheet. Other sheets can be added by repeating the bonding sequences as outlined above.

The method described above can be practiced quite advantageously by providing the sheets in the form of thin film plastic material. The plastic material should be compatible with the heat exchange media used, and for many applications a polyvinyl material has been found to be suitable. The thickness of the material, as well as the width and spacing of the bond lines, will depend upon the design parameters for the particular application contemplated. However, it can be stated that generally the thickness dimension of the material should be between about 0.0005 to 0.02 inch, and desirably between about 0.002 and 0.006 inch. A thickness dimension of 0.004 inch has been found suitable for many applications. The spacing of the bond lines between adjacent pairs of sheets would normally be between about 0.1 inch to 2.0 inch, and desirably between about 0.25 and 1.0 inch. A spacing of 0.65 inch has been found to be generally satisfactory. Thus, the diagonally oriented single thickness sheet portions of the unitized structure would have a width dimension normally no greater than between about 0.1 to 2.0 inch, and desirably no greater than between 0.25 and 1.0 inch, with a spacing no greater than about 0.65 being found to be suitable. The bond lines themselves should have a width dimension as small as is practical, while achieving the desired goal of obtaining proper bonding, and a width dimension no greater than 0.2 inch (and even no greater than 0.05 inch in some instances) has been found to be practical.

The heat exchange apparatus of the present invention is adapted for use as a counterflow heat exchanger, a coflow heat exchanger or a condenser/evaporator type heat exchanger. This apparatus comprises a unitized heat exchange structure, having a longitudinal axis, a lateral axis and a vertical axis. The apparatus is made up of a plurality of thin film sheets aligned longitudinally and laterally and spaced vertically from one another. Alternate first pairs of sheets are bonded one to another along a plurality of first longitudinally extending bond lines positioned at predetermined laterally spaced first locations across the sheets. Intermediate second pairs of sheets are bonded one to another along a plurality of second longitudinally extending bond lines. These second bond lines are positioned at laterally spaced second locations across said sheets. The intermediate second pairs of sheets are made up of adjacent sheets of adjacent first pairs of sheets. The second bond lines along which the intermediate pairs of sheets are joined one to another are positioned transversely intermediate of the locations of the first set of bond lines.

As indicated in the above description of the method of making the heat exchange apparatus, these sheets are arranged in an expanded pattern so as to define a plurality of generally diamond-shaped passageways arranged in vertical and transverse rows with respect to one another. Each diamond-shaped passageway which is positioned at an interior location in the unitized heat exchange structure is defined by four diagonally oriented single-thickness sheet portions and two laterally oriented double-thickness bonded sheet portions.

There is a manifold structure at opposite ends of the unitized heat exchange structure to direct a first heat exchange medium through a first set of alternately spaced rows of passageways, and to direct a second heat exchange medium through a second set of intermediate rows of passageways positioned alternately with the rows of the first set. Thus, heat exchange takes place across the thickness of the four diagonally oriented single-thickness sheet portions.

The manifold structure at each end of the unitized heat exchange structure is desirably the same as, or similar to, that described above with respect to the method of making the heat exchange apparatus of the present invention. Thus, in the preferred form, each end of the unitized structure is embedded in a molded structure, which in turn is connected to the manifold structure, with the passages of the manifold structure aligned with related passageways of the heat exchange structure.

When the apparatus of the present invention is used as a counterflow heat exchanger, one heat exchange medium is directed through a first manifold at a first end to flow in a first direction through a first set of alternately spaced rows of heat exchange passageways. A second heat exchange medium is directed into the opposite end of the heat exchanger through a second manifold and into a second set of alternately spaced rows of passageways, said second set being spaced intermittently with respect to the first set. In one embodiment, the pressure of the first heat exchange medium at the entry portion into the passageways is at a higher level than the pressure of the second heat exchange medium which is exiting from its related passageways, and the pressure of the second heat exchange medium at its entrance area into its passageways is at a higher pressure than that of the first heat exchange medium as it is exiting from its related passageways. Thus, when the unitized structure is made from thin film flexible plastic, at one end of the heat exchange structure, one set of passageways is caused to curve outwardly to increase the cross-sectional area of said passageways. At the opposite end of the heat exchanger, the other set of passageways are caused to expand outwardly in a rounded configuration to increase their cross-sectional area. Since the changes in cross-sectional areas cause corresponding changes in the relative velocity of the heat exchange mediums going through the passageway, this in turn affects the rate of heat transfer which is dependent upon liquid velocity as one of the influencing factors. In another arrangement, one heat exchange medium is maintained at a higher pressure with respect to the second heat exchange medium throughout the length of the heat exchange apparatus.

When the present invention is employed as a condenser-type heat exchanger, a first liquid heat exchange medium is directed through a first set of alternately spaced rows of passageways. Desirably, this is accomplished by directing the liquid medium as a falling thin film along the surfaces defining the passageways, which are vertically oriented. A second vaporized heat exchange medium is directed into the other set of alternate passageways spaced intermittently with the first set, and is caused to condense on the surfaces defining this second set of passageways. In the preferred form, both heat exchange mediums are directed into one end of the heat exchange apparatus through a manifold structure such as that described above, and are collected at the other end of the heat exchange structure by means of a second manifold structure.

When the present invention is employed as a coflow heat exchanger, one heat exchange medium is directed through a first manifold at a first end thereof to flow in a first direction through a first set of alternately spaced rows of heat exchange passageways. A second heat exchange medium is directed into the same first manifold to flow into a second set of alternately spaced rows of heat exchange passageways to flow through the heat exchanger in the same direction as the first heat exchange medium. In one embodiment, the pressure of one of the heat exchange media is maintained at a higher level than that of the second heat exchange medium so that the passageways of one set are caused to curve outwardly along substantially their entire length to increase the cross-sectional area of said passageways. In a second embodiment, the pressures of the heat exchange media are maintained at nearly the same level so that there is less outward expansion of the walls forming the passageways.

Other features of the present invention will become apparent from the following detailed description.

DESCRIPTION OF THE PREFERRED EMBODIMENTS

Since the present invention is particularly adapted for a large scale operation of converting saline water to fresh water, the following description will be directed particularly toward that application. However, it is to be understood that within the broader aspects of the present invention, it could be utilized in other applications. In the following description, the material will be organized under appropriate headings.

A. GENERAL DESCRIPTION OF A SALINE TO WATER CONVERSION SYSTEM

Figure 1:
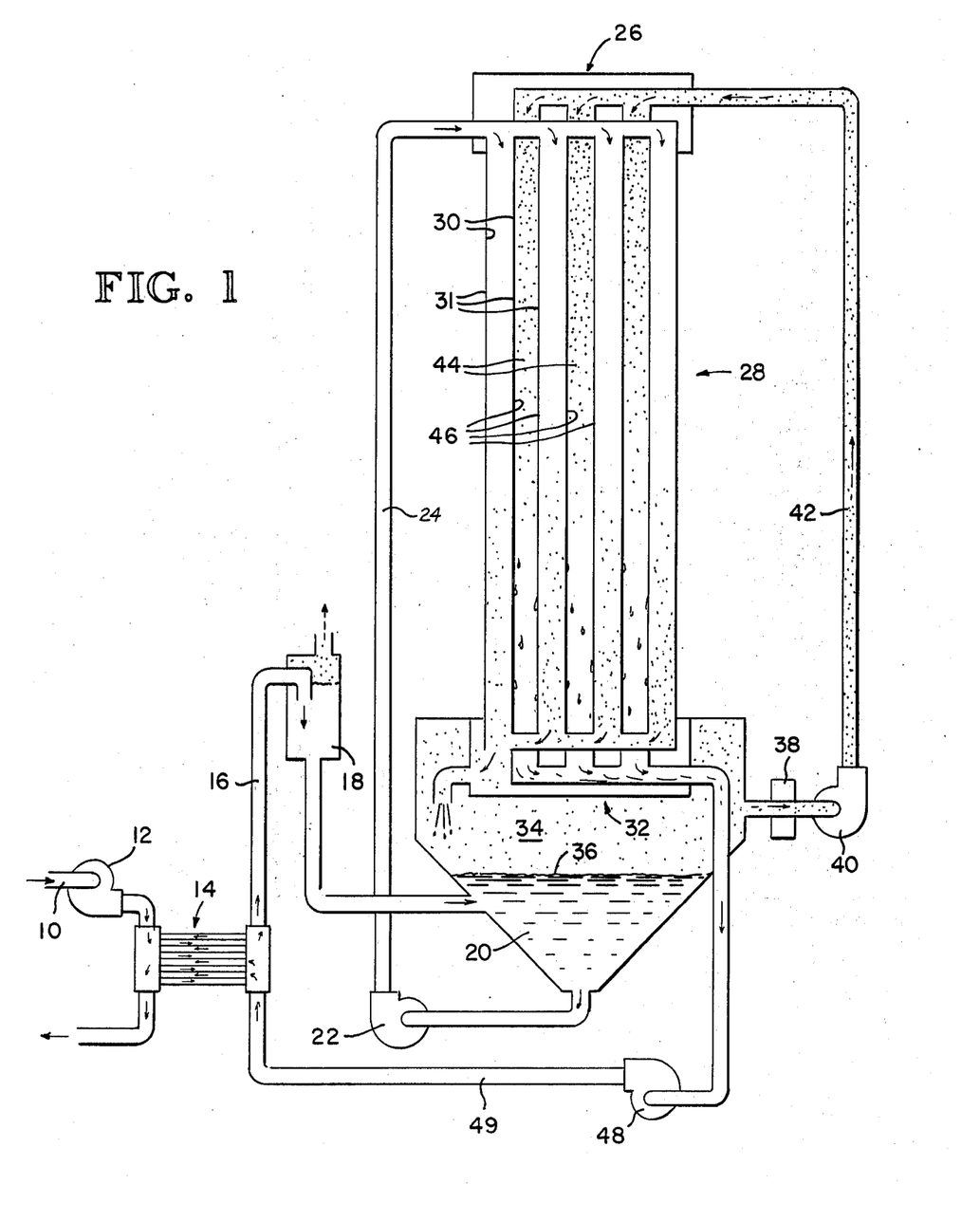
FIG. 1 is a schematic view of a condenser/evaporator heat exchange system particularly adapted for converting salt water to fresh water, and adapted to utilize the heat exchange apparatus and methods of the present invention.

In FIG. 1, there is a schematic showing of a typical salt water to fresh water conversion system employing the apparatus and methods of the present invention. This method is commonly called vapor recompression. Salt water is taken in through an intake pipe 10 and by means of a pump 12 is directed through a counterflow heat exchanger 14 to raise the temperature of the salt water to near its boiling point (e.g., up to about 200° F.). From the heat exchanger 14 the salt water continues its flow through a conduit 16, through a deaerator 18 and into a salt water sump 20. In some circumstances it is necessary to add some heat to the salt water in the sump 20, and this is accomplished by conventional heating means (not shown here for ease of illustration).

The salt water is pumped by a recirculating pump 22 upwardly through a conduit 24 to a distribution manifold 26 at the upper end of a condenser/evaporator heat exchanger 28. Both of the heat exchangers 14 and 28, are particularly significant in the present invention, and will be described in more detail later herein. However, to indicate briefly the general mode of operation of this condenser/evaporator type heat exchanger 28, the brine (i.e., salt water) is directed as a film of falling water downwardly on surfaces 30 of walls 31 to be collected in a lower manifold 32, redirected to the salt water sump 20, and recirculated back through pump 22 to the distribution manifold 26. The steam which is formed from this falling film of water is directed into area 34 of sump 20 above the level of the salt water (indicated at 36), and this steam is directed from the area 34 to be passed through a de-mister 38 into a steam compressor 40. The compressor 40 compresses the steam to some pressure determined by the desired operating conditions (e.g., 3.0 psi gauge) so that the temperature of the steam is higher than the recirculating fluid on the surface 30. The steam from the compressor 40 is directed through a steam conduit 42 into the aforementioned distribution manifold 26.

The steam passes from the distribution manifold 26 into passageways 44 defined by wall surfaces 46 on opposite sides of the heat exchange walls 31 from the surfaces 30. With the film of falling sea water on the surfaces 30 being at approximately 212° F., and with the steam in the passageways 44 being at a higher temperature, heat from the steam passes through the walls 31 so that the steam forms as condensate on the walls 46 and falls downwardly into the collection manifold 32. The pure water collected as condensate in the manifold 32 is directed by a pump 48 through a pipe 49 and back through the counterflow heat exchanger 14, where this pure water is placed in heat exchange relationship with the incoming salt water.

An analysis of the system described above will soon lead one to the conclusion that for this system to operate in a manner to produce pure water in any significant quantities, a substantial amount of heat transfer area is required for both of the exchangers 14 and 28. For example, with the walls which provide the heat transfer surfaces being made of thin film plastic (having a thickness of about 0.002 inch, and a heat transfer coefficient of approximately 250, and a driving temperature of 5° delta temperature), to produce about 300,000 gallons of water per day, the condenser/evaporator type heat exchanger 28 would require between approximately 70,000 to 90,000 square feet of heat exchange wall. For the counterflow heat exchange 14, for an effectiveness of 95% and 300,000 gallons per day, approximately 14,000 to 16,000 square feet of heat exchange wall would be required.

B. METHOD OF MANUFACTURING THE HEAT EXCHANGERS OF THE PRESENT INVENTION

The material preferred for the heat exchange walls of the present invention is a thin film plastic, so the following description will be directed toward the use of that particular material. However, it is to be understood that within the broader aspects of the present invention, other material could be used. A first embodiment of the method of manufacturing a heat exchange unit of the present invention is described with reference to FIGS. 2 through 11.

Figure 2:
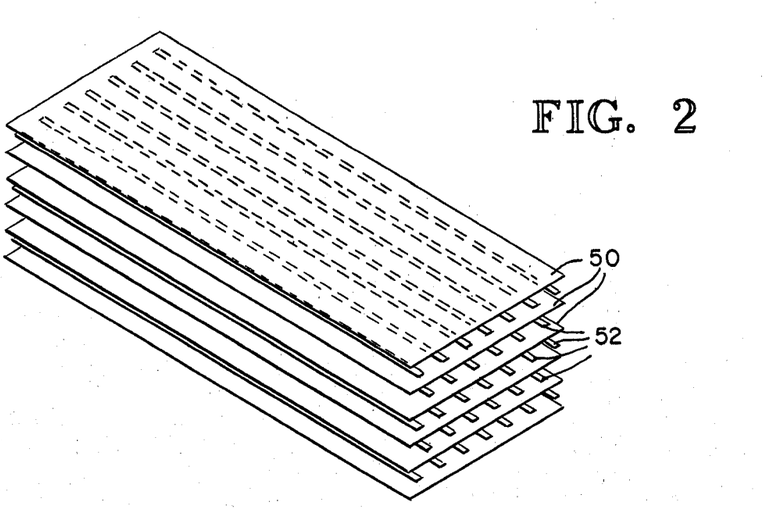
FIG. 2 is a view of a "stack-up" of the main components utilized in a first embodiment of a method of making a unitized heat exchange structure of the present invention.

FIG. 2 does not represent an actual step in the manufacturing process, but is an exploded view of the basic components of the heat exchange structure, which is provided to illustrate the main components utilized and their relative location. As shown in FIG. 2, there are a plurality of rectangular sheets 50 of thin film plastic. In a typical commercial installation, while not being necessarily limited to these dimensions, the length of the sheets could be between about 20 to 50 feet, and the width dimensions between about 1 to 6 feet. For ease of illustration, in FIGS. 2 through 11, only six sheets 50 are shown, it being understood that a substantially greater number could be used. Typically, the sheets 50 could be made of 2 to 4 mil Tedlar (a trademark identifying a polyvinylfluoride type plastic material), and would be made as thin as practical, consistent with the operational requirements of the end configuration. The thickness of the sheets can be between about 0.0005 to 0.02 inch, and desirably between about 0.002 to 0.006 inch, with a sheet thickness of 0.004 inch having been found suitable for a number of applications.

Positioned between each adjacent set of sheets 50 are a plurality of elongate separating strips 52. These separating strips 52 are longitudinally aligned with the sheets 50 and are located at regularly spaced intervals across the width dimension of the sheets 50. The separating strips 52 are positioned in sets that are staggered in an alternating relationship. Thus a first set of strips (i.e., the set of strips between the first and second sheet, between the third and fourth sheet, etc.) are vertically aligned with one another (i.e., positioned one directly above the other), and the separating strips 52 of the second alternate sets (i.e., between the second and third sheets, fourth and fifth sheets, etc.), are vertically aligned with one another in vertical planes spaced intermittently between the vertical planes occupied by the strips 52 of the first alternate sets. As indicated above, the arrangement shown in FIG. 2 is not intended to represent an actual step in the manufacturing process, but it is an exploded view in which the components 50 and 52 are shown in a pre-bonded configuration and moved away from one another in a vertical axis to provide a better illustration of the arrangement of these components.

Figure 3:
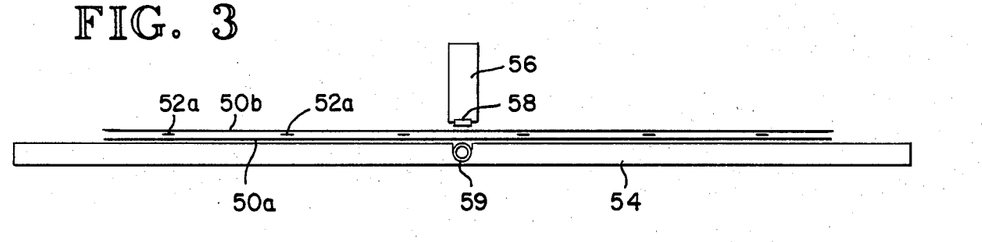
FIGS. 3 through 5 are a series of semi-schematic side elevational views illustrating the manner in which the components of FIG. 2 are heat sealed one to another to form a unitized heat exchange structure.
Figure 4:
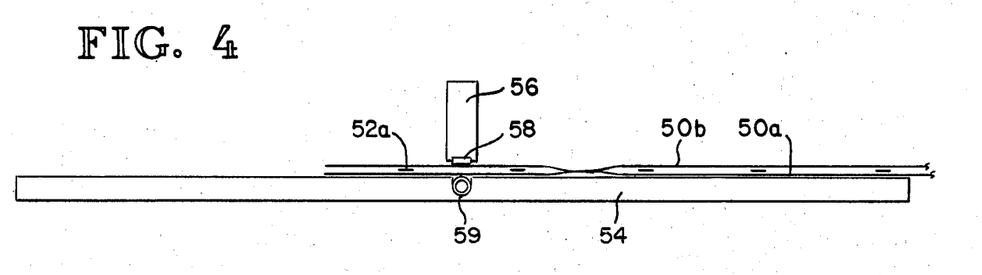
Figure 5:
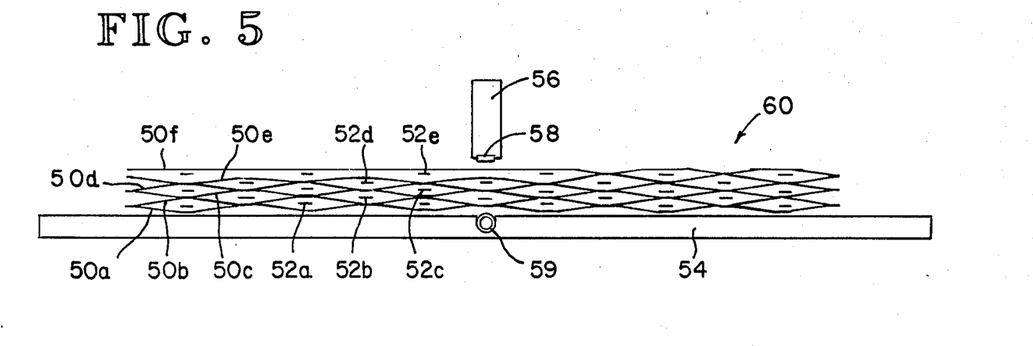

FIGS. 3 through 5 show a series of simplified steps by which the components of the lay-up of FIG. 2 can be heat sealed one to another to form a unitized heat exchange structure. There is shown a support platform 54 above which is positioned an elongate pressure block 56 having a lengthwise dimension substantially equal to that of the lengthwise dimensions of the sheets 50 and strips 52, and positioned a moderate distance above the platform 54. Extending along the lower surface of the block 56 is a heating and contact element 58 having substantially the same length and width dimensions as the desired heat seal. Recessed in the platform 54 below the location of the heating and contact element 58 is an elongate inflatable air hose 59.

Initially, the two lowermost sheets 50*a* and 50*b* are placed one above the other on the platform 54, with a set of separating strips 52*a* being properly positioned between the two sheets 50*a* and 50*b* at regularly spaced lateral intervals between the locations at which bonding is desired between the two sheets 50*a* and 50*b*. This lay-up of the plastic sheets 50*a* and 50*b* and strips 52*a* is placed in longitudinal alignment with the pressure block 56. The air hose 59 is inflated to raise the portions of the sheets 50*a* and 50*b* immediately below the heating element 58 and cause the heating and contact element 58 to press against the upper surface of the top sheet 50*b*. Electricity is directed through the element 58 for a short period of time to heat the element 58 sufficiently to soften the sheet portions immediately below, after which the flow of current is discontinued to permit the sheet portions to cool and thus cause an elongate heat seal to occur at a location between two adjacent strips 52*a*. Then, the two sheets 50*a* and 50*b* are moved laterally relative to the block 56 so that the block 56 is between the next set of adjacent strips 52*a*, and the same heat seal operation is repeated. This is continued along the width of the sheets 50*a* and 50*b* until there is an elongate heat seal between each of the strips 52*a*.

Next, a third sheet 50*c* is placed above the second sheet 50*b*, with a plurality of separating strips 52*b* being positioned therebetween at the same width intervals as the aforementioned strips 52*a*. However, these strips 52*b* are offset with respect to the strips 52*a*, so that each strip 50*b* is located (as viewed from above) midway between a pair of adjacent strips 52*a*. Again a heat impulse and pressure are applied through the heating and contact element 58 to cause bonding of the sheets 50*b* and 50*c* at locations between adjacent strips 52*b* and directly above strips 52*a*. The strip 52*a* prevents sealing of the two lower sheets 50*a* and 50*b* one to another at the location of strips 52*a*.

Thereafter, a fourth sheet 50*d* is laid above the sheet 50*c*, with a third set of strips 52*c* being placed therebetween and in vertical alignment with the first set of strips 52*a*. Thereafter the same heat sealing steps are performed by application of the block 56 with its heating and contact element 58. The subsequent sheets 50*e* and 50*f* and strips 52*d* and 52*e* are assembled and bonded in a similar manner to form a unitized heat exchange structure. In FIG. 5, for purposes of illustration the sheets 50*a*–50*f* are shown "expanded" away from one another. However, it is to be understood that during the bonding operation, the sheets 50*a*–50*f* lie one against the other.

Figures 6, 6A, 6B, 7, 8, 9, 10:
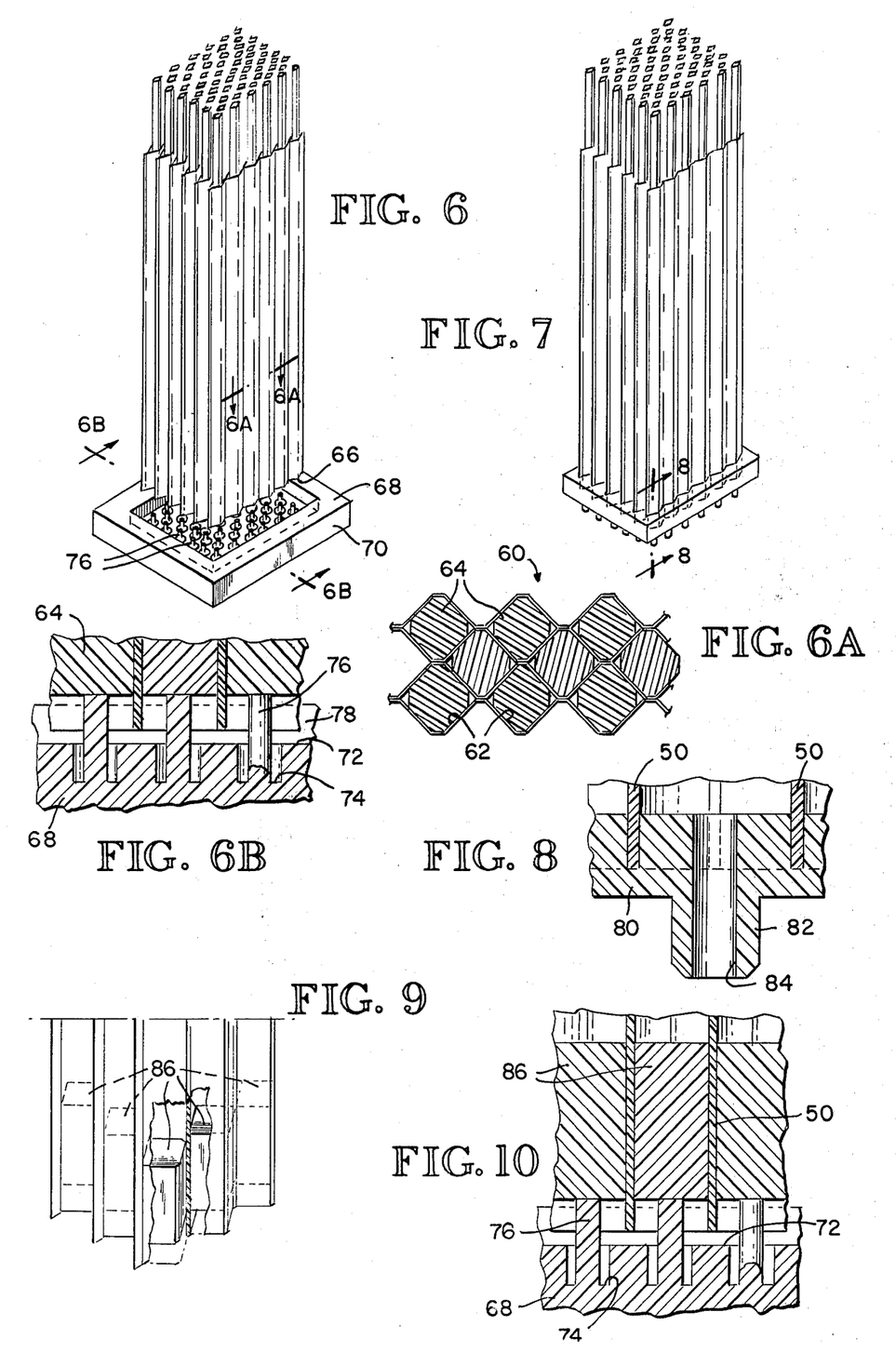
FIG. 6 is an isometric view of the manner in which one end of the structure made according to FIGS. 3 through 5 is bonded to a molded end piece.
FIG. 6A is a sectional view taken along line 6A—6A of FIG. 6 illustrating the unitized structure made according to steps 3 through 5 in its expanded position.
FIG. 6B is a sectional view taken along line 6B—6B, showing an end portion of the unitized heat exchange structure of FIG. 6 being bonded to a molded material to form an end base structure.
FIG. 7 is an isometric view of the unitized heat exchange structure of FIG. 6 with one end base structure molded thereto.
FIG. 8 is a sectional view, drawn to an enlarged scale, illustrating a portion of the molded base structure of FIG. 7.
FIG. 9 is an isometric view of the free end of the unitized structure of FIG. 7, having a set of forming segments therein prior to having a second end base structure molded thereto.
FIG. 10 is a view similar to FIG. 6B showing the end of the structure shown in FIG. 9 being molded to a second base structure.

The heat separating strips 50*a*–50*e* are removed from the unitized structure, which is identified as 60. The unitized heat exchange structure 60 is then "expanded" in the vertical axis (i.e., in a direction perpendicular to the planes of the sheets 50) to move the unbonded portions of the sheets 50*a* through 50*f* away from one another so that the structure 60 then defines a plurality of passageways 62, each passageway 62 having a generally "diamond-shaped" cross-sectional configuration, as shown in FIG. 6A. One convenient method of "expanding" the structure 60 is to apply pressurized air into one end of the structure 60 while restraining the same. With the structure 60 so expanded, a plurality of shaping rods 64 are inserted one in each passageway 62 so as to maintain the proper configuration of the passageways 62 after the source of pressurized air is withdrawn. Each shaping rod 64 has a diamond-shaped configuration with vertical and lateral dimensions substantially the same as the desired end configuration of the diamond-shaped passageways 62. Each rod is positioned in in its related passageway 62 in a manner that the lower edge of each rod 64 is positioned a moderate distance (e.g., 1½ inches) above the lower edge 66 of the sheets 50a through 50f forming the unitized structure 60.

The next step is to encase one end of the unitized structure 60, in its expanded configuration, in a molded end structure which is to become one of the base members of a heat exchange module which is to be formed. To accomplish this, there is provided a mold 68 having rectangular side walls 70 and a bottom wall 72 formed with a plurality of cylindrical depressions 74 (See FIG. 6B). These cylindrical depressions 74 are arranged in parallel rows, with the depressions 74 of adjacent rows being staggered with respect to one another in generally the same pattern as that of the passageways 62. Extending upwardly from each depression is a related one of a plurality of forming studs 76.

To form the base member, the mold 68 is filled with a liquid material 78 which solidifies to form the base member. Then the assembly of the utitized structure 60, with the forming rods 64 therein is positioned with its longitudinal axis vertically oriented, as shown in FIG. 6, and the downwardly positioned end is lowered into the mold 68 so that the forming studs 76 are centered in the passageways 62 of the structure 60. The lower edge portions of the sheets 50 forming the unitized structure 60 are located so as to extend a moderate distance into the molten material 78. The liquid material 78 is then permitted to cure and harden into an end base member 80, which is then removed from the mold 70. The resulting configuration of this base member 80 is that of a shallow rectangularly shaped block having a plurality of downwardly extending nipple elements 82 (formed by the depressions), 74 each having therein a plurality of through openings 84 (formed by the studs 76). The lower edge portions of the sheets 50 are imbedded part way into the rectangular base member 80. (See FIG. 8.)

Subsequent to the formation of the base member 80, a slightly modified process is used to form a similar base member at the opposite end of the unitized structure 60. The shaping rods 64 are removed from the passageways 62, and a plurality of relatively short shaping segments 86 are inserted into the open ends of the passageways 62. Each segment 86 has a cross-sectional configuration substantially the same as the passageways 62, and is only about two to three inches in length. For a reason to be described hereinafter each segment 86 is made of a material (e.g., Seraben), which is solid at ordinary room temperatures, but melts at a relatively low temperature (e.g., about 150° F.).

Each segment 86 is pushed into its related passageway 62 a sufficient distance so that end edge portions of the sheets 50 forming the unitized structure 60 extend beyond the segments 86 a moderate distance (e.g., 1½ inches). The mold 66 is again filled with a forming material 78, and the second end of the unitized structure with the segments 86 therein is imbedded into the molten material 78, in the same manner as described above. When this material hardens a second base member 88, substantially identical to the first base member 80 is formed on the opposite end of the unitized structure 60. To remove the shaping segments 86 from the interior of the passageways 62, the second end of the unitized structure 60 (i.e., the end with the second base member 88) is heated to an extent sufficient to bring the shaping segments 86 above their melting point. The material forming the shaping segments 86 melts and simply passes out the through openings 84 formed in the second end base 88.

With the two ends of the unitized structure 60 imbedded one in each end base members 80 and 88, a first manifold structure 90 is connected to the one end base 80 and a second manifold structure 92 is connected to the second end base 88. Since the structure of these manifolds 90 and 92 is considered to be significant in the present invention, these will be described in the section immediately following the description of the heat exchange module.

C. STRUCTURE OF THE HEAT EXCHANGE MODULE

Figures 11, 12:
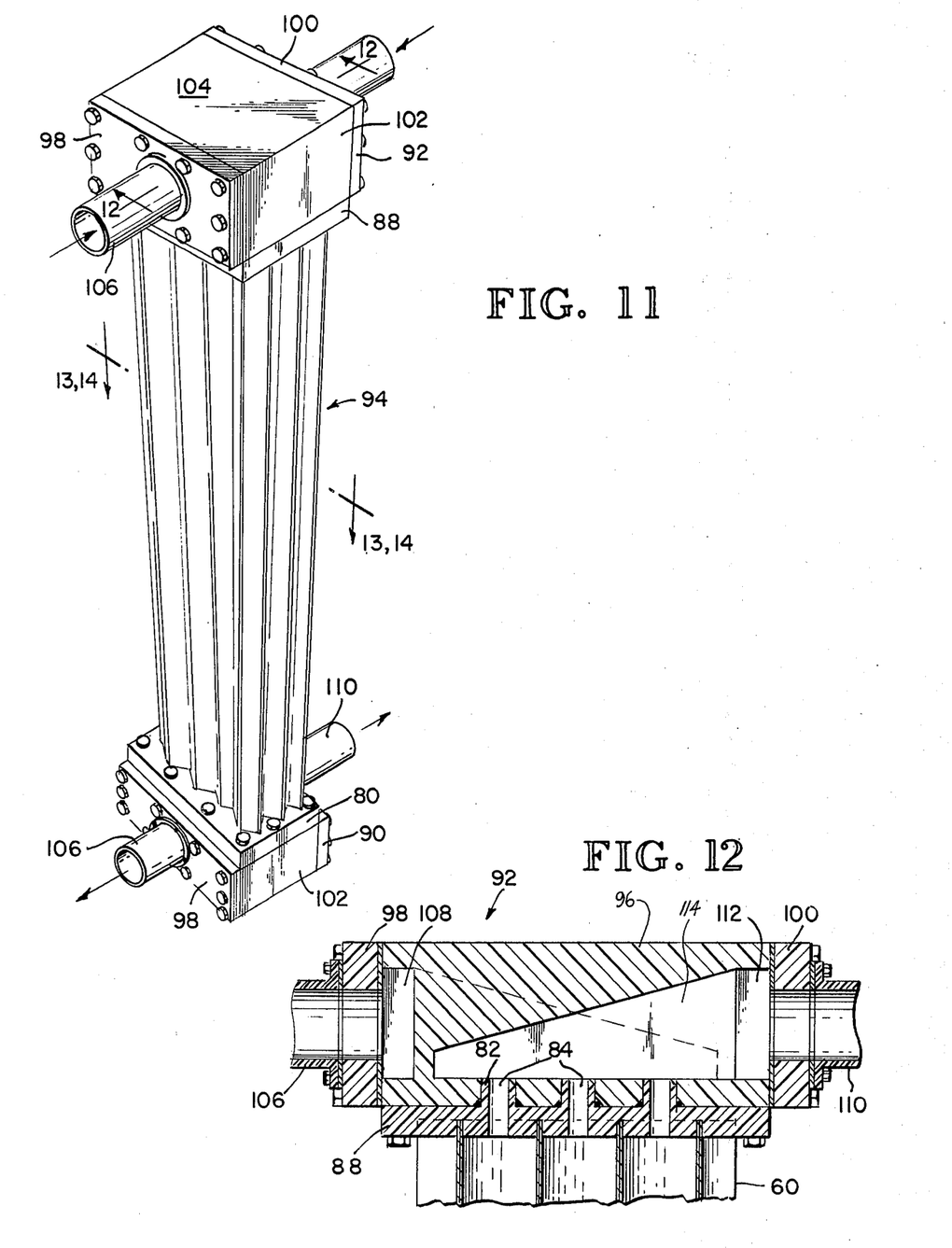
FIG. 11 is an isometric view of a heat exchange unit utilizing the unitized heat exchange structure and end base structures made according to the steps shown in FIGS. 3 through 10.
FIG. 12 is a sectional view taken along line 12—12 of FIG. 11.

The unitized heat exchange structure 60, with the two end bases 80 and 88 and their associated manifolds 90 and 92 comprise a single heat exchange module, generally designated 94, and shown in perspective in FIG. 11. Since the two manifold units 90 and 92 are substantially identical, only one such unit 92 will be described herein.

Figure 13:
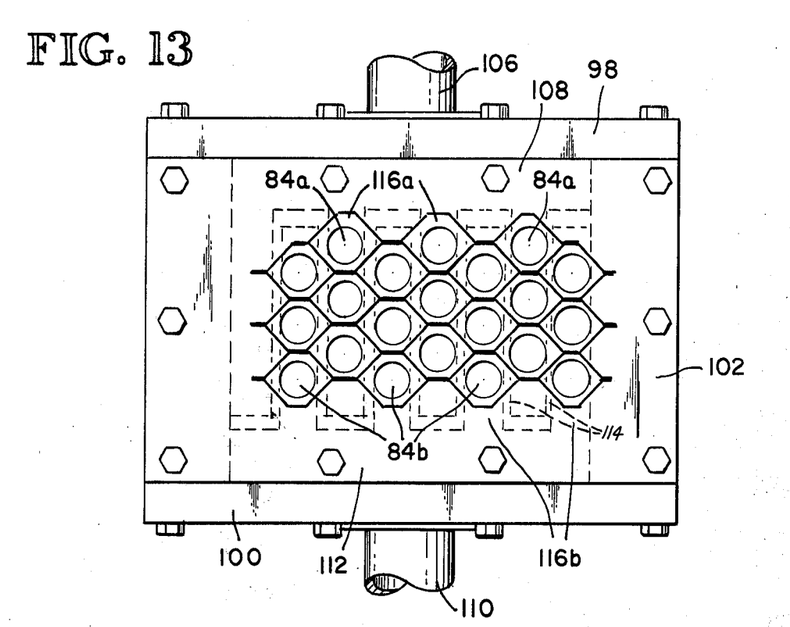
FIG. 13 is a sectional view taken along line 13—13 of FIG. 11.

With reference to FIGS. 12 and 13, it can be seen that the manifold unit 92 comprises a box-like housing 96 having end walls 98 and 100, side walls 102, and a top wall 104. In describing the manifold unit 92, the terms "front" and "rear" will denote proximity to end walls 98 and 100, respectively; the term "upper" will denote proximity to the top wall 104; the term "lower" will denote proximity to that portion of the housing 96 adjacent the end base 80 and 88; and the term "lateral" shall denote the axis extending perpendicular to the side walls 102. The manifold unit 92 has a front conduit 106 leading to a forward manifold chamber 108 extending across the front of the manifold 92, and a rear conduit 110 leading to a rear manifold chamber 112. The manifold housing 96 has a plurality of longitudinally extending wall members 114 which divide the interior of the manifold 92 into a plurality of longitudinal distribution channels 116, spaced laterally from one another (See FIG. 13.)

These channels 116 are arranged in an alternating pattern, so that half of the channels 116a open to the front manifold chamber 108, while the other half of the channels 116b, positioned intermittently between the channels 116a, open to the rear manifold chamber 112. Thus, these channels 116a and 116b are so arranged that the one set of channels 116a communicates with a first set of alternate rows of openings 84 in the end base 88, and the second set of channels 116b communicates with a second set of rows of openings 84 positioned intermittently between the first set of rows of openings 84. This can be seen more clearly from an examination of FIG. 13, where the openings of the first set of rows are designated 84a, and the openings of the second set of rows are designated 84b.

Figure 14:
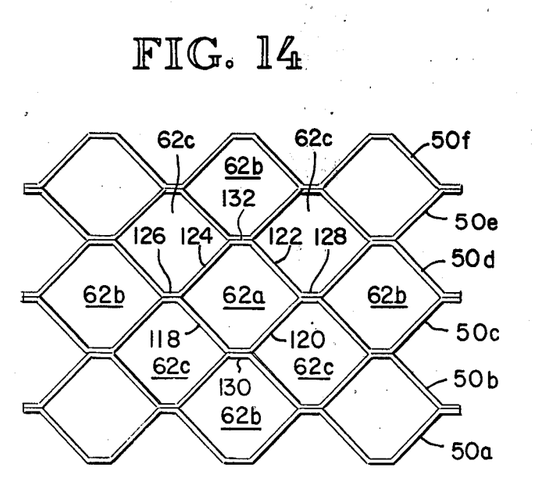
FIG. 14 is a sectional view, drawn to an enlarged scale, taken along line 14—14 of FIG. 11; and showing the configuration of the unitized heat exchange structure in more detail.

With regard to the cross-sectional configuration of the plastic sheets 50 which form the unitized structure, reference is made to FIG. 14, where a portion of the unitized heat exchange structure 60 of the module 94 is shown in transverse section. It can be seen that each sheet 50 is arranged in what might be described as a "zigzag" pattern, by which the several sheets 50 define the aforementioned diamond shaped passageways 62. For purposes of analysis, attention is focused on one passageway in FIG. 14, designated 62a. With further reference to FIG. 14, the sheets 50 making up the section shown are designated sequentially (beginning from bottom to top, as seen in FIG. 14) as 50a, 50b, 50c, 50d, 50e and 50f.

It can be seen that the single passageway 62a is defined by two portions of the sheets 50c and 50d, these portions being in the configuration of four diagonally aligned walls 118, 120, 122 and 124. The two wall sections 118 and 124 meet at a first bond line 126 which is a juncture line of the two sheets 50c and 50d. The two wall portions 120 and 122 meet at a second bond line 128 which is a second juncture line of the two sheets 50c and 50d. The two wall sections 118 and 120 meet at a bond line 130 which is formed at a juncture line of the two sheets 50b and 50c, and the two wall sections 124 and 122 meet at a bond line 132 which is a juncture point of the two sheets 50d and 50e.

For the further purposes of analysis, attention is again directed to FIG. 14 and consideration is given to the passageways adjoining the passageways 62a. In describing the location of these passageways with reference to FIG. 14, the words "upper" and "lower" will denote proximity to the upper and lower sections of FIG. 14, respectively, while the terms "right" and "left" will denote proximity to the right and left portions, respectively, of FIG. 14. The passageways which are directly above, below, to the right and to the left of the passageway 62a are designated 62b, and it will be noted that according to the distribution pattern of the manifold 92, the heat exchange medium which is directed into the passageway 62a is also directed into these passageways 62b. The passageways which are positioned diagonally from the passageway 62a and immediately adjacent thereto are designated 62c. It is also apparent from the distribution pattern of the manifold 92 that the heat transfer medium directed into the passageways 62c is different from that directed into the passageways 62a and 62b. It will be further noted that the passageway 62a is separated from these passageways 62c only by a single wall thickness formed from portions of the sheets 50c and 50d (namely, the wall portions 118, 120, 122 and 124). The interface which the passageway 62a has with the upper and lower passageways 62b is along, respectively, the bond lines 130 and 132. For purposes of obtaining maximum heat transfer, the width dimensions of these bond lines 130 and 132 is desirably kept to a minimum. Thus, with reference to the manufacturing steps described with reference to FIGS. 2 through 5, the width dimension of the bonding element 58 is made as small as possible, while being consistent with the requirement that the bonding strength be adequate to avoid separation of the sheets 50 at the location of the bond. Generally, the bond line width no greater than 0.2 inch has been found to be practical, and in some instances it has been suitable to provide bond line widths of 0.05 or even smaller.

D. OPERATION OF THE HEAT EXCHANGE MODULE AS A COUNTERFLOW HEAT EXCHANGER

As indicated earlier herein in the description of the apparatus of FIG. 1, in that particular application, the counterflow heat exchanger 14 functions to take in salt water at a relatively low temperature (i.e., 66° F.), and raise the temperature of the salt water to approximately 200° F. by passing it in counterflow heat exchange relationship with the pure water produced by the desalinization system. While the heat exchange module 94 shown in FIG. 11 is shown with a relatively small number of heat exchange passageways 62, it is to be recognized that in an actual commercial operation a single heat exchange module 94 could be provided with a much greater number of such passageways 62. Also, it is to be recognized that a plurality of such modules 94 could be placed both in series and in parallel relationship so that both the effective length and number of such heat exchange passageways could be increased substantially.

To describe the operation of a single heat module 94 as part of a counterflow heat exchange 14, in the application of the apparatus of FIG. 1, the pump 12 directs the salt water into one conduit 106 of one manifold unit 92, with this water passing into the manifold chamber 108, into the set of distribution channels 116a, and thence through those passageways 62 which communicate with the channels 116a. After completing travel through those passageways 62, the sea water passes into the second manifold 90 and thence out the conduit 106 of that manifold unit 90.

The hot water flows into the other conduit 110 of the manifold unit 90 to pass into the distribution channels 116b of that manifold unit 90 and into a second group of passageways 62 and flow in a direction opposite to the sea water. After completing travel through its appropriate passageways 62 the fresh water passes into the manifold 92 and out the conduit 110 of the manifold unit 92.

In discussing the function of the heat exchange module 94, consideration will be given to two factors, namely, (a) heat exchange characteristics of the module 94, and (b) its structural characteristics.

With regard to the heat exchange characteristics, reference is again made to FIG. 14 and attention is again directed to a single passageway 62a. Let it be assumed that the cold salt water is entering this passageway 62a. In accordance with the distribution system of the manifold unit 92, the colder salt water would also be flowing through the four passageways 62b, while the warmer fresh water would be flowing in the opposite direction through the passageways 62c. With regard to the passageway 62a, heat exchange between the salt water and fresh water takes place over the four surfaces 118, 120, 122 and 124.

As indicated earlier herein, when metal of a high thermal conductivity is used to form the heat exchanger walls, the conductivity of such metal is is relatively high. However, the material used in thin film plastic heat exchangers has a thermal conductivity that is substantially less than that of its metal counterpart, so the thickness of the walls forming the heat exchange surfaces becomes more critical than when metal is used. It will be noted that the walls 118–124 which define the passageway 62a have a thickness equal to the thickness of each of the sheets 50 forming the unitized heat exchange structure 60. However, it will be noted that the thickness at the two bond areas 130 and 132 is made up of the thickness of two sheets 50. Since the heat exchange medium in the two passageways 62b above and below the passageway 62a is the same as that in the passageway 62a, the only heat transfer which could occur across these juncture areas 130 and 132 would be because of some rather minor temperature differential between two portions of the same heat exchange medium, and this would be of no consequence. To keep the heat exchange surfaces 118-124 as large as possible, relative to the size of the passageway 62a, desirably the width dimension of the heat seal 52 is kept as small as possible, consistent with the requirements that adequate sealing take place to preserve the structural integrity of the unitized heat exchange structure 60.

Figure 15:
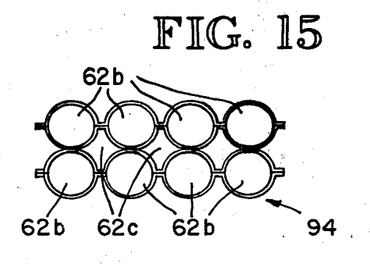
FIG. 15 is a view similar to view 14 showing the configuration of the unitized heat exchange structure when used as a counterflow heat exchanger, with one heat exchange medium being at a higher pressure than the other.

With regard to the structural characteristics of the heat exchange module 94, reference is now made to FIG. 15. Since the two heat exchange media (i.e., the salt water and the fresh water) are pumped through the heat exchange module 94 in opposite directions, it can be presumed that the passageways 62 become pressurized to some extent. In FIG. 15, where a section of the heat exchange structure 50 is shown, let it be presumed that the passageways 62b carrying one medium are pressurized to a higher level than the passageways 62c carrying the other medium. Since the sheet material 50 is made of thin plastic which is quite flexible, the wall surrounding the passageways 62b will tend to "bulge" outwardly toward a circular configuration. Thus, the wall portions defining each passageway 62b are placed in hoop tension. In a structural sense, the resulting configuration is a plurality of somewhat rounded, pressurized tubular members, with each interior tubular member being joined along four longitudinal bond lines to adjacent tubular members, so that there is formed a substantially rigid structure.

In the event that one of the bond lines is improperly formed so that the bond is broken, there is no intermixing of the two heat exchange media. With reference to FIG. 14, let it be assumed that the bond at the bond line 126 gives way so that there is direct communication between the passageway 62a and the passageway 62b immediately to the left. Since both have the same heat exchange medium therein, there would be no contamination between the two heat exchange media, and little if any transfer of liquid since both passages have essentially the same pressure.

To discuss a further facet of the present invention as a counterflow heat exchanger, the passageways 62 could be pressurized in either of two ways. One method would be to pressurize the set of passageways for one fluid medium at a substantially higher pressure so that the pressure along the entire length of such passageways would always remain at a higher pressure than the passageways carrying the other fluid heat exchange medium. In this instance, the passageways assuming the "rounded" configuration would remain rounded along the entire length of the heat exchange passageway 62.

On the other hand, if the pressures of the two heat exchange mediums are more nearly equal, then a somewhat different configuration will result. Since the two heat exchange media are pumped into the passageways at opposite ends of the heat exchanger 94, and since each heat exchange medium will experience a pressure drop as it flows through the heat exchanger 94, one heat exchange medium will have a higher pressure at one end, and the other heat exchange medium will have a higher pressure at the other end.

The resulting configuration of the passageways 62 is that one set of passageways 62 with one fluid medium therein will have the outwardly rounded configuration at one end of the heat exchanger, while the other set of passageways carrying the other fluid medium, will have the outwardly rounded configuration at the opposite end of the heat exchanger. This particular arrangement can influence to some degree the rate of heat exchange between the two media. To explain this more fully, the rate of heat exchange, in addition to being influenced by the resistance to heat transfer of the heat exchange wall, is also influenced by the resistance of the fluid medium itself to transfer heat. It is known that if a liquid is passing over a heat exchange surface at a greater rate of speed, the resistance of the fluid to the transmission of heat to the adjoining wall surface is diminished. The effect of this is that at the area where the heat exchange passageways are "rounded", so as to have a greater cross-sectional area, the flow of liquid is at a lower velocity.

On the other hand, where the heat exchange passageways are diminished in cross-sectional area by having the adjacent passageways in a rounded configuration, the lineal velocity of the liquid flow is greater, so that there is less resistance to heat transfer by the liquid to the adjoining heat exchange walls. Since an increase in cross-sectional area increases the rate of lineal velocity of the liquid to a lesser degree than does a decrease in cross-sectional flow area of the same amount, it can be surmised that in some circumstances there is a net gain in heat transfer effectiveness by virtue of the passageways 62 distorting moderately from the diamond-shaped configuration in the manner described above.

E. OPERATION OF THE HEAT EXCHANGE MODULE AS A CONDENSER TYPE HEAT EXCHANGER

Figure 16:
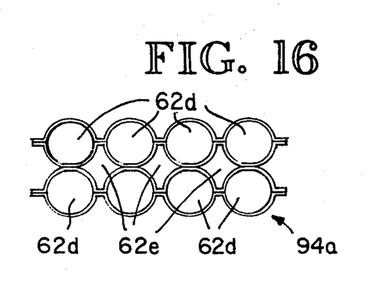
FIG. 16 is a view similar to FIGS. 14 and 15 of the unitized heat exchange structure used as a condensor/evaporator type heat exchange structure.

When the heat exchange module 94 is used as a condenser/evaporator type heat exchanger, such as the one indicated at 28 in FIG. 1, it is positioned so that the passageways 62 are vertically oriented. Reference is made to FIG. 16 which shows in section a portion of the heat exchange module 94a being used as the condenser/evaporator type heat exchanger 28. In this particular application as a condensor-type heat exchanger, the module will be designated 94a.

In FIG. 16, the passageways 62 which are pressurized by the compressed steam are designated 62d, while the passageways which carry the falling film of salt water are designated 62e. The pressurized steam is directed into one of the manifold conduits 106 or 110 of the manifold 92 to be directed into the passageways 62d while the salt water is directed into the other of the manifold conduits 106 or 110 of the manifold 92 to pass into the other passageways 62e. To direct the salt water into the top of the passageway 62e as a film, suitable nozzle means are provided at the upper ends of the passageways 62e.

As heat is transferred from the steam in the passageway 62d through the film plastic walls to the falling film of salt water on the opposite side of the walls, the steam condenses as pure water on the surfaces defining the passageways 62d. This condensed fresh water is collected in the lower manifold 90 to be directed outwardly therefrom to the one of the lower manifold conduits 108 or 112, and the falling salt water is likewise collected in the lower manifold 90 and directed out the other conduit 106 or 110 and back to the sump 20.

It can be seen from FIG. 16 that the passageways 62d, being pressurized to a higher pressure than the passageways 62e, assume a rounded configuration, in somewhat the same manner as the passageways 62b of FIG. 15. Structurally, this has the same effect as described previously with reference to FIG. 15, in that the heat exchange structure 60 becomes relatively rigid under such pressurization. In the event that the bond gives way at any location, the system does not become depressurized since the effect is only to permit one pressurized passageway 62d to communicate with a second pressurized passageway 62d of essentially equal pressure.

F. OPERATION OF THE HEAT EXCHANGE MODULE AS A COFLOW HEAT EXCHANGER

Although a coflow heat exchanger is not shown in the system of FIG. 1, the apparatus of the present invention can also be used as a coflow heat exchanger. In this instance, one heat exchange medium is directed into one of the manifold conduits 106 or 110 of the manifold 92 to be directed into a first set of passageways, while the second heat exchange medium is directed into the other of the manifold conduits 106 or 110 of the manifold 92 to pass into the other set of passageways. As in the previous embodiments, heat exchange takes place between the fluid media in the passageways 62 across the diagonally slanted single thickness portions of the sheets 50 of the heat exchanger 94.

In some applications, it may be desirable to direct one fluid medium into the heat exchanger 94 at a higher pressure. Under this circumstance, the unitized heat exchange structure 60 would assume a configuration such as that shown in FIG. 15. In other instances, it may be desirable to direct the two fluid media into the heat exchanger at substantially the same pressure. In that situation, the unitized heat exchange structure would assume a configuration more resembling that shown in FIG. 14, except that the passageways located at the periphery of the structure 60 would be outwardly rounded if the pressure in the heat exchange passageways is greater than ambient pressure.

G. ALTERNATE METHOD OF MAKING THE HEAT EXCHANGE STRUCTURE

Figures 17, 18:
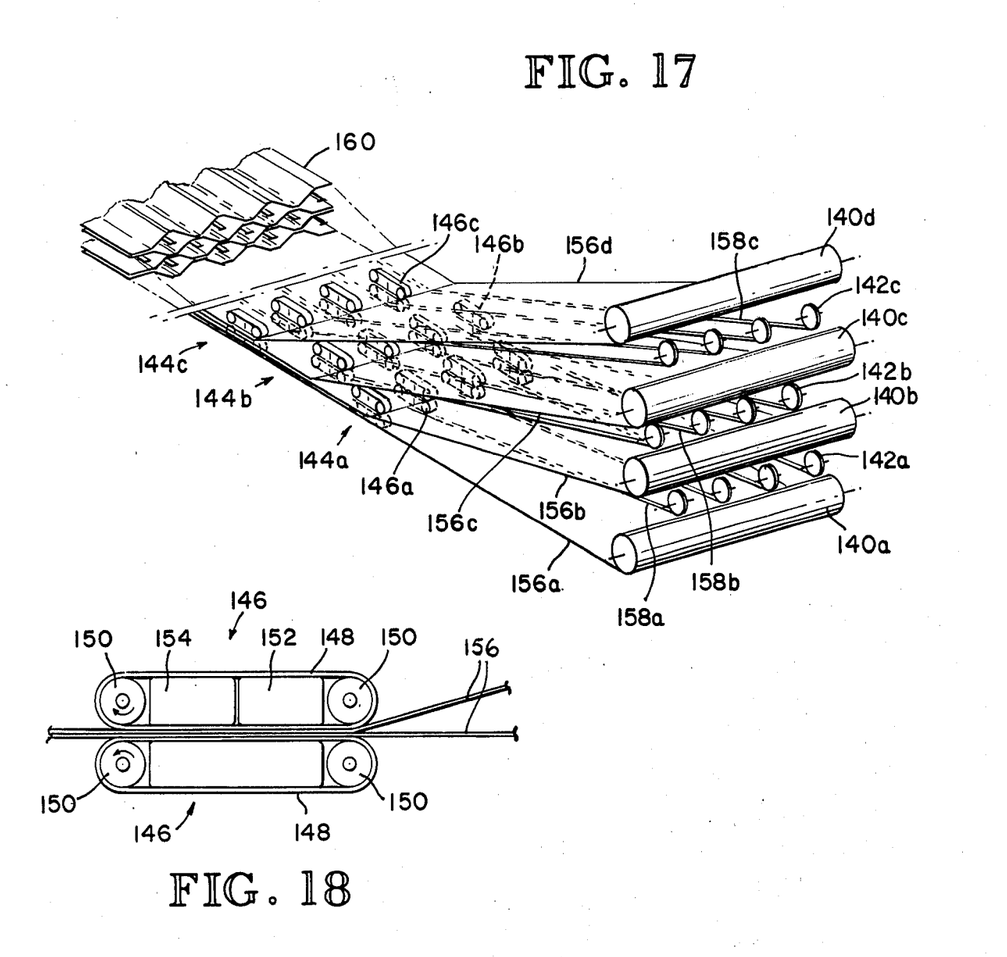
FIG. 17 is a semi-schematic drawing of a continuous manufacturing process of making the unitized heat exchange structure of the present invention.
FIG. 18 is a side elevational view of one pair of bonding elements used in the process shown in FIG. 17.

FIG. 17 illustrates semi-schematically a modified form of making the heat exchange structure 60. For convenience of illustration there are shown only four sheets 50 being bonded one to another.

There are four rolls 140 of plastic sheet material, designated 140a, 140b, 140c and 140d. There are also three sets of rolls of separating strip, these rolls being designated 142a, 142b, and 142c. These sets of strip rolls are positioned each between a related pair of the sheet rolls 140a through 140d, with the set of strip rolls 142a being between the sheet rolls 140a and 140b, the set of strip rolls 142b being between the two sets of sheet rolls 140b and 140c, and the set of strip rolls 142c being positioned between the two sheet rolls 140c and 140d.

Sheet material from the four rolls 140a through 140d and separating strip material from the three sets of rolls 142a through 142c are fed simultaneously in a longitudinal direction into a bonding area. There are three bonding stations, designated 144a, 144b, and 144c. At each of the bonding stations 144a through 144c, there are a set of pairs of bonding elements 146. At the first station 144a, the number of pairs of bonding elements 146 is equal to the number of bond lines being formed, and each pair of bonding elements 146 is longitudinally aligned at locations transversely intermitted with respect to the strip rolls 142a.

With reference to FIG. 18, each bonding element 146 comprises an endless contact belt 148 which rides over a pair of end rollers 150. Each contact element 146 has at its rear end a heating device 152 and at its forward end a cooling device 154, both of which are positioned between the upper and lower runs of the belt 148. The two belts 148 are placed one above the other so that adjacent surfaces of the belts are in contact with one another or at least very closely adjacent one another. At least one of the rollers 150 of each bonding element 146 is a drive roller so that the two belts 148 can be caused to travel continuously to provide for continuous through feed between the two belts 148.

To describe the bonding operation accomplished by a single pair of continuous bonding elements 146, in FIG. 18, there are shown two portions of sheet material 156 being fed between the two bonding elements 146. The rate of travel of the sheets 156 is the same as the lineal rate of travel of the two contact belts 148. As a pair of sheets 156 is fed between pairs of bonding elements 146, the two heating devices 152 soften the portions of the sheets 156 therebetween so that a heat seal can be formed, and as the sheet portions pass between the cooling elements 154, they become cooled to finalize the heat seal. The two belts 148 apply adequate pressure to cause proper heat sealing.

Reference is now made to FIG. 17 to describe the overall bonding process. At the first bonding station 144a, sheet material 156a and 156b from the two lower rolls 140a and 140b is fed into the first set of bonding elements 146a along with the several lengths of separating strips 158a from the rolls 142a, these strips being positioned intermediate of the bonding locations of the elements 146a. The bonding elements 146a cause heat sealing at the location of the bonding elements 146a and the two pieces of sheet material 156a and 156b proceed on to the next bonding station 144b where they are fed through the bonding elements 146b at the second bonding station 144b. At the same time, sheet material 156c from the third roll 140c and separating strips 158b from the rolls 142b are also fed into the location between the pairs of contact elements 146b at the second bonding station 144b. However, at this second bonding station 144b, the bonding elements 146b are offset with respect to the elements 146a and are positioned over the strips 158a. Also the rolls 142b are offset with respect to the strip rolls 142a so that so as to be positioned directly over the bond lines between the two sheets 156a and 156b. Thus, at the second bonding station 144b, the sheet material 156c from the third roll 140c is bonded to the previously bonded sheets 156a and 156b from the two lowermost rolls 140a and 140b, and the separating strips 158a prevent additional bonding of the sheets 156a and 156b at locations intermediate of the existing bond lines therebetween. The three pieces of sheet material 156a, b and c passing from the second bonding station 144b pass on to the third bonding station 144c where the sheet material 156d from the top roll 140d and also the strips 158c from the rolls 142c are also fed into this bonding area 144c. The alignment of the strips rolls 142c is the same as that of the strip rolls 142a, and the alignment of the bonding elements 146c are the same as the elements 146a, so that the bonding at the third bonding station 144c is accomplished with the bond lines being vertically above the bond lines created at the station 144a. The separating strips 158b prevent additional bonding between the sheets 156*b* and 156*c* at locations intermediate the existing bond lines therebetween. The strips 158*c* will prevent additional bonding between the sheets 156*c* and *d* at such time as a fifth sheet (not shown here for convenience of illustration) is bonded to the fourth sheet 156*d*.

It can be appreciated that by the continuous bonding process described above, the same unitized structure is formed as that described previously herein with reference to FIGS. 2 through 5. The bonded assembly which passes continuously from the bonding areas 144*a* through 144*c* can be cut into lengths as desired to form heat exchange modules in the same manner as described previously herein. In FIG. 17 a portion of the four sheets 156, bonded together to form a unitized structure, is illustrated at 160. For purposes of illustration, these have been shown in a somewhat expanded configuration. It is to be understood of course, that additional sheets 156 and strips 158 could be utilized to make a larger heat exchange structure.

What is claimed is:

1. A heat exchange apparatus adapted for use either as a counterflow heat exchanger, a coflow heat exchanger or a condenser/evaporator type heat exchanger, said apparatus comprising:
   a. a unitized heat exchanger structure, having a longitudinal axis, a lateral axis, and a vertical axis, said apparatus comprising:
      1. a plurality of thin film flexible sheets aligned longitudinally and laterally with one another and spaced veritically from one another;
      2. alternate pairs of said sheets being bonded one to another along a plurality of first longitudinally extending bond lines, positioned at predetermined laterally spaced first locations across said sheets;
      3. intermediate pairs of said sheets being bonded one to another along a plurality of second longitudinally extending bond lines positioned at laterally spaced second locations across said sheets, each of said second bond lines being positioned laterally intermediate each of said first locations, each of said intermediate pairs of sheets being made up of adjacent sheets of adjacent alternate pairs of said sheets;
      4. said sheets being arranged in an expanded pattern defining a plurality of generally diamond-shaped passageways arranged in vertical and lateral rows with respect to one another, each of said diamond-shaped passageways which are positioned in an interior location in said unitized structure being defined by four diagonally oriented single thickness sheet portions and two laterally oriented continuously and longitudinally extending double thickness bonded sheet portions;
   b. means operatively connected to said unitized structure to direct a first heat exchange medium through a first set of alternately spaced rows, and to direct a second heat exchange medium through a second set of intermediate rows positioned alternately with the rows of the first set, whereby heat exchange is able to take place between said heat exchange medium across said diagonally oriented single thickness sheet portions.

2. The apparatus as recited in claim 1, wherein there are a pair of manifold structures mounted at opposite ends of said unitized structure, each of said manifold structures defining a first manifold chamber having a first set of alternate rows of feed passages connecting to alternate rows of passageways of said unitized structure, and a second manifold chamber connecting to a second set of intermediate feed passages positioned alternately between the feed passage of the first set and communicating with the second intermediate rows of passageways of the unitized structure.

3. The apparatus as recited in claim 2, wherein each of said manifold structures has a front end and a rear end, said first manifold chamber being positioned at the front end of said manifold structure, with the first alternate set of feed passages extending from said first chamber in a rearward direction, said second manifold chamber being positioned at a rear end of said manifold chamber, with said second set of intermediate passages extending forwardly from said rear manifold chamber, with forwardly and rearwardly extending wall members separating the first alternate set of passages from the second intermediate set of passages.

4. The apparatus as recited in claim 1, wherein each end of said unitized structure has a base member comprising a molded structure in which end edges of said unitized structure are embedded, each base member having a plurality of through openings communicating with related passageways in said unitized structure.

5. The apparatus as recited in claim 4, wherein there is for each base member a related manifold structure, each manifold structure defining a first manifold chamber having a first set of alternate rows of feed passages connecting to alternate rows of said unitized structure, and a second manifold chamber connecting to a second set of intermediate feed passages positioned alternately between the feed passages of the first set and communicating with the second intermediate rows of passageways of the unitized structure.

6. The apparatus as recited in claim 5, wherein each manifold structure has a front end and a rear end, said first manifold chamber being positioned at the front end of said manifold structure, with the first alternate set of feed passages extending from said first chamber in a rearward direction, said second manifold chamber being positioned at a rear end of said manifold chamber, with said second set of intermediate passages extending forwardly from said rear manifold chamber, with forwardly and rearwardly extending wall members separating the first alternate set of passages from the second intermediate set of passages.

7. The apparatus as recited in claim 5, wherein one of said base member and said manifold structure has a plurality of outwardly extending nipples defining through openings, and the other of said base member and manifold structure has a plurality of matching holes to receive said nipples, whereby interengagement of the base member and the manifold structure assures proper engagement and proper alignment of the manifold structure with the base member.

8. The apparatus as recited in claim 1, wherein said sheets are made of a thin film flexible plastic material having a thickness dimension between about 0.0005 to 0.02 inch.

9. The apparatus as recited in claim 8, wherein each of the laterally oriented double thickness bonded sheet portions has a width dimension no greater than about 0.2 inch.

10. The apparatus as recited in claim 1, wherein said sheets are made of a thin film flexible plastic material having a thickness dimension between about 0.002 to 0.006.

11. The apparatus as recited in claim 1 wherein the diagonally oriented single thickness sheet portions defining said passageways each have a width dimension between about 0.1 to 2.0 inch.

12. The apparatus as recited in claim 1, wherein the diagonally oriented single thickness sheet portions defining said passageways each have a width dimension between about 0.25 to 1.0 inch.

13. The apparatus as recited in claim 1, wherien each of the diagonally oriented single thickness sheet portions defining the passageways has a width dimension no greater than about 0.65 inch.

14. The apparatus as recited in claim 1, wherein each of the laterally oriented double thickness bonded sheet portions has a width dimension no greater than about 0.05 inch.

15. The apparatus as recited in claim 1, wherein
 a. said sheets are made of a thin film flexible plastic material having a thickness dimension between about 0.0005 to 0.02 inch,
 b. each of said diagonally oriented single thickness sheet portions has a width dimension between about 0.1 to 2.0 inch,
 c. each of said laterally oriented double thickness bonded sheet portions has a width dimension no greater than about 0.2 inch.

16. The apparatus as recited in claim 1, wherein
 a. said sheets are made of a thin film flexible plastic material having a thickness dimension no greater than about 0.006 inch,
 b. each of said diagonally oriented single thickness sheet portions has a width dimension no greater than about 1.0 inch,
 c. each of said laterally oriented double thickness bonded sheet portions has a width dimension no greater than about 0.05 inch.

* * * * *